United States Patent [19]

Barnes et al.

[11] 4,268,660

[45] May 19, 1981

[54] ACCELERATED POLYMERIZATION OF 2-PYRROLIDONE

[76] Inventors: Carl E. Barnes, 482 Trinity Pass, New Canaan, Conn. 06840; Arthur C. Barnes, 320 Stamford Ave., Stamford, Conn. 06902

[21] Appl. No.: 129,401

[22] Filed: Mar. 10, 1980

Related U.S. Application Data

[60] Division of Ser. No. 84,813, Oct. 15, 1979, which is a division of Ser. No. 39,773, May 17, 1979, Pat. No. 4,217,442, which is a continuation-in-part of Ser. No. 899,066, Apr. 24, 1978, abandoned.

[51] Int. Cl.³ .............................................. C08G 69/24
[52] U.S. Cl. .................................... 528/315; 528/312; 528/313; 528/319; 528/326
[58] Field of Search ............... 528/315, 313, 312, 319, 528/326

[56] References Cited

U.S. PATENT DOCUMENTS

| | | | |
|---|---|---|---|
| 2,638,463 | 5/1953 | Ney et al. | 528/326 |
| 2,809,958 | 10/1957 | Barnes et al. | 528/326 |
| 2,973,343 | 2/1961 | Ney | 528/326 |
| 3,060,153 | 10/1962 | Follett | 528/326 |
| 3,069,392 | 12/1962 | Clark et al. | 528/326 |
| 3,174,951 | 3/1965 | Taber | 528/326 |
| 3,721,652 | 9/1970 | Barnes | 528/326 |
| 3,835,100 | 9/1974 | Sekiguchi et al. | 528/326 |
| 4,098,774 | 7/1978 | Bacskai | 528/315 |

OTHER PUBLICATIONS

Die Makromolekulare, 161 (1972), p. 64.

*Primary Examiner*—Harold D. Anderson

[57] ABSTRACT

A novel method of utilizing quaternary ammonium compounds to accelerate the polymerization of 2-pyrrolidone is disclosed. The method consists of dehydrating the hygroscopic quaternary ammonium compound by adding it to 2-pyrrolidone and distilling over, under vacuum, a portion of the pyrrolidone whereby the water is removed and then adding the residue to a conventional anhydrous polymerization mixture composed of an alkali metal salt of 2-pyrrolidone dissolved in 2-pyrrolidone and effecting polymerization by adding a polymerization initiator and heating the mixture to a temperature ranging from about room temperature to about 60° C.

1 Claim, No Drawings

ACCELERATED POLYMERIZATION OF 2-PYRROLIDONE

RELATED APPLICATIONS

This application is a division of Application Serial No. 84,813 filed Oct. 15, 1979 which application was a division of Application Ser. No. 39,773 filed May 17, 1979, now Pat. No. 4,217,442 which in turn was a Continuation-In-Part of Application Ser. No. 899,066 filed Apr. 24, 1978 now abandoned.

BACKGROUND OF THE INVENTION

This invention relates to the use of normally wet quaternary ammonium compounds as accelerators for the polymerization of 2-pyrrolidone. The anionic polymerization of this substance is well known in the art and was first disclosed in U.S. Pat. No. 2,638,463. Improved methods of polymerizing 2-pyrrolidone are disclosed in many subsequent patents, for example U.S. Pat. No. 3,721,652, but all involve the use of an alkali metal derivative of 2-pyrrolidone, or similar derivative, as a catalyst. To initiate the polymerization an additional substance customarily referred to as an "activator" is required. Preferred activators are $CO_2$ and $SO_2$ although many other substances such as N-acetyl pyrrolidone may be used. In order for polymerization to occur the system must be substantially anhydrous. It has been determined that the presence of more than about 0.1% of water, based on the 2-pyrrolidone monomer, effectively retards or prevents polymerization and less than this amount of water is preferred.

As disclosed in out co-pending application Ser. No. 39,773, now U.S. Pat. No. 4,217,442, the addition of certain quaternary ammonium compounds, especially the sulfates and bisulfates, causes a marked increase in the rate of polymerization of 2-pyrrolidone. Such an increase in the polymerization rate is of great commercial value. But in order to achieve this and indeed in order to effect any polymerization at all it is essential that the system be anhydrous. Obviously the quaternary ammonium compound cannot simply be added to the polymerization mixture since all quaternary ammonium compounds are very hygroscopic and therefore normally wet. They are also thermally unstable and drying by heating even under vacuum is likely to result in some decomposition. The operation is at best a compromise between the need to raise the temperature to a point where all the water may be removed and the need to keep the temperature below the point where thermal decomposition may occur. When intended for addition to a 2-pyrrolidone polymerization mixture, even slight thermal decomposition is almost as detrimental as having some water present since the amines formed in the decomposition are inhibitors to the polymerization.

It is therefore the object of this invention to provide a method of polymerizing 2-pyrrolidone in which the accelerating effect of the quaternary ammonium compound may be utilized.

SUMMARY OF THE INVENTION

We have found that the accelerating effect of quarternary ammonium compounds on the rate of polymerization of 2-pyrrolidone may be utilized by first dissolving or suspending the quaternary ammonium compound in 2-pyrrolidone, distilling over a portion of the 2-pyrrolidone under vacuum and adding the residue to a conventional anhydrous polymerization mixture consisting of an alkali metal salt of 2-pyrrolidone and a polymerization initiator. Rapid polymerization results when this mixture is heated to a temperature ranging from about room temperature to about 60° C.

DETAILED DESCRIPTION OF A PREFERRED EMBODIMENT

The anionic polymerization of 2-pyrrolidone requires substantially anhydrous conditions. Quaternary ammonium compounds on the other hand are very hygroscopic and therefore normally wet. Therefore it is essential that some practical way be found to introduce the quaternary ammonium compound into the polymerization mixture while still retaining anhydrous conditions.

We have found that quaternary ammonium compounds may be utilized as accelerators for the polymerization of 2-pyrrolidone by first dissolving them, or in some cases suspending them, in 2-pyrrolidone and then distilling over, under reduced pressure, a portion of the 2 pyrrolidone which results in the removal of the water. Usually from 10 to 50% of the pyrrolidone is sufficient to distill over, but the amount depends on how wet the quaternary ammonium compound is.

The resulting dry solution or suspension of the quaternary ammonium compound in 2-pyrrolidone is then added to an anhydrous polymerization mixture consisting of an alkali metal salt of 2-pyrrolidone dissolved in 2-pyrrolidone. The mixture is then polymerized by adding a polymerization initiator and heating to a temperature of from about room temperature to about 60° C. A more preferred temperature is from about 30° to 50° C. when $SO_2$ is used as the initiator and from about 35° to 55° C. when $CO_2$ is used. The most preferred temperatures are from about 38° to 42° C. when $SO_2$ is used and from about 48° to 52° C. when $CO_2$ is used.

We prefer to use an amount of $SO_2$ ranging from about 0.004 to about 0.008 mol per mol of 2-pyrrolidone or an amount of $CO_2$ ranging from about 0.01 to about 0.05 mol per mol of 2-pyrrolidone. When using $SO_2$ we prefer to dilute it with dry nitrogen gas in a ratio of about 2 parts of nitrogen to 1 part of $SO_2$.

The potassium salt of 2-pyrrolidone is preferred over the sodium salt as the catalyst. The amount used may vary from about 0.01 to 0.15 mol per mol of 2-pyrrolidone, and more preferably from about 0.03 to 0.08 mol and most preferably from about 0.04 to 0.055 mol per mol of 2-pyrrolidone.

The amount of quaternary ammonium compound used may vary widely although we prefer to use from about 0.01 to 0.06 mol per mol of 2-pyrrolidone, more preferably from about 0.02 to 0.03 mol per mol of 2-pyrrolidone.

In the following examples the quaternary ammonium compound was weighed in its wet condition using an amount which would equal the desired amount of the anhydrous material. This was calculated from a determination of the amount of anion found in a weighed wet sample, e.g. the amount of sulfate ion actually present in a weighed wet sample of tetrabutyl ammonium sulfate.

EXAMPLE 1

A quantity of wet tetrabutyl ammonium bisulfate equal to 6.0 grams (0.018 mol) of the anhydrous salt was added to 70 grams of purified 2-pyrrolidone in a 250 ml 3-necked flask equipped with a gas inlet tube, a thermometer for measuring pot temperature and a distillation head also having a thermometer for measuring the temperature of the vapor. The distillation head was connected to a condenser and a receiver having a vacuum connection. Water at about 35° C. was circulated through the condenser for cooling.

The system was evacuated to 5 mm Hg pressure and 20 grams of pyrrolidone was distilled over carrying with it the water from the hygroscopic quaternary ammonium salt. While the water was distilling over with the pyrrolidone the pressure rose to 10 mm Hg and the pot temperature was 108° C. When all the water had distilled over the pressure again dropped to 5 mm thus indicating that all the water was removed.

The pressure in the flask was then brought to atmospheric by admitting nitrogen gas through the gas inlet tube and the mixture cooled to room temperature. This pyrrolidone solution of the anhydrous quaternary ammonium salt was then transferred to a small polyethylene bottle and tightly capped for later use.

The alkaline catalyst was then prepared by placing 70 grams of purified 2-pyrrolidone in a 250 ml 3-necked flask, equipped as described above, and adding 7.8 grams of 85% assay potassium hydroxide (0.12 mol anhydrous) and evacuating the system. 20 grams of the pyrrolidone was distilled over to remove the water formed by the reaction of the KOH with the amide hydrogen of the 2-pyrrolidone to form the potassium salt, the actual catalyst. Again the pressure rose to 10 mm while the water was distilling over and dropped to 5 mm when the solution became anhydrous. The contents of the flask was cooled to room temperature and dry nitrogen gas was admitted to bring the pressure to atmospheric.

The anhydrous solution of tetrabutyl ammonium bisulfate stored in the polyethylene bottle was then added to the anhydrous catalyst solution in the flask thus forming a mixture consisting of 90 grams of 2-pyrrolidone containing 6.0 grams of anhydrous tetrabutyl ammonium bisulfate and 14.56 grams of anhydrous potassium pyrrolidonate. The system was again evacuated and 0.03 mol of dry $CO_2$ was added to initiate polymerization. Alternatively the $CO_2$ may be admitted at atmospheric pressure. The mixture was brought to atmospheric pressure by admitting dry nitrogen gas and then transferred to a polyethylene polymerization bottle which was tightly capped and placed in an oven at 50° C. After 2½ hours the bottle was removed from the oven and the polyethylene stripped from the polymer cake. The very hard polymer cake was immersed in liquid nitrogen which caused it to break into small pieces. These were then ground in a Wiley mill, washed with water and dried. The conversion was found to be 46%. The viscosity, measured as a 5% solution in 88% formic acid was 15 Stokes, corresponding to an inherent viscosity of 5.1 dl/g when measured as a 0.5 g/dl solution in hexafluoroisopropanol at 25° C.

EXAMPLE 2

The procedure of Example 1 was followed except for the following changes:

In place of the tetrabutyl ammonium bisulfate, 21.3 grams of a 60% aqueous solution of tetrabutyl ammonium sulfate was added to 80 grams of 2-pyrrolidone and 32 grams of the pyrrolidone was distilled over to give an anhydrous solution containing 12.8 grams (0.022 mol) of the quaternary ammonium salt.

In making the alkaline catalyst only 3.9 grams of 85% KOH was used (0.059 mol anhydrous) being added to 80 grams of 2-pyrrolidone and 23 grams distilled over.

In place of the $CO_2$, 0.006 mol of $SO_2$ (diluted with dry nitrogen) was used to initiate the polymerization. After 3⅓ hours at 38° C. the conversion was 63% and the viscosity was greater than 148 Strokes (a molecular weight in excess of one million).

EXAMPLE 3

6.0 grams (0.055 mol) of moist tetramethyl ammonium chloride was added to 70 grams of 2-pyrrolidone in a reaction flask equipped as described in Example 1. 20 grams of the pyrrolidone was distilled over under vacuum to remove the water from the quaternary ammonium salt.

4.0 grams (0.06 mol) of potassium hydroxide pellets (85% assay) was added to 70 grams of purified 2-pyrrolidone in the reaction flask and 20 grams distilled over under vacuum.

The two solutions were mixed as described in Example 1. 0.0059 mol of $SO_2$ was added and the mixture poured into a polymerization bottle and heated at 50° C. for 8 hours. At the end of this time the polymer cake was ground, washed with water and dried. The conversion was 46% and the viscosity 27 Stokes, corresponding to an inherent viscosity of 5.6 dl/g in hexafluoroisopropanol.

It will thus be seen that the polymerization of 2-pyrrolidone may be accelerated by adding quaternary ammonium compounds, dried as described in the foregoing disclosure, to a polymerization mixture consisting of an anhydrous solution of an alkali metal pyrrolidonate in 2-pyrrolidone, in the presence of a polymerization activator. Since certain changes may be made in the exact proceedures without departing from the scope of the invention, it is intended that the examples as well as the descriptive matter be interpreted as illustrative rather than in a limiting sense.

What is claimed is:

1. A method of accelerating the polymerization of 2-pyrrolidone comprising adding a quaternary ammonium compound to 2-pyrrolidone, distilling over under vacuum from 5 to 50 percent of the 2-pyrrolidone and adding the anhydrous residue therefrom as an accelerator to an anhydrous polymerization mixture comprising 2-pyrrolidone, an alkali metal salt of 2-pyrrolidone and a polymerization initiator, and heating the mixture to a temperature of from about 25° to 60° C. whereby a melt extrudable polypyrrolidone is formed.

* * * * *